DEVICE FOR GUIDING AND DRIVING LINEAR RECORDING CARRIERS IN APPARATUSES FOR MAGNETIC SIGNAL RECORDING AND REPRODUCING

Filed Oct. 22, 1965 2 Sheets-Sheet 1

Inventors:
Karl Heinz Greifenhagen
Peter Wilhelm

Inventors:

Karl Heinz Greifenhagen
[illegible]

United States Patent Office 3,506,271
Patented Apr. 14, 1970

3,506,271

DEVICE FOR GUIDING AND DRIVING LINEAR RECORDING CARRIERS IN APPARATUSES FOR MAGNETIC SIGNAL RECORDING AND REPRODUCING

Karl Heinz Greifenhagen and Dieter Söhnlein, Kronach, Oberfranken, Germany, assignors to Loewe Opta G.m.b.H., Berlin, Germany, a company of Germany Filed Oct. 22, 1965, Ser. No. 502,678
Claims priority, application Germany, Oct. 31, 1964, L 38,270, Patent 1,910,566
Int. Cl. G11b 5/00
U.S. Cl. 274—4 5 Claims

ABSTRACT OF THE DISCLOSURE

A U-shaped swivelling lever in a tape recorder is provided in addition to a pressure roller which can be pressed against a tape driving roller, said lever is provided with a carrier arm on each leg; said carrier arms carry between their free ends a tape guide roller and a swivelling pressure lever for pressing the tape against an erase head and a recording/reproducing head.

Figure 2:
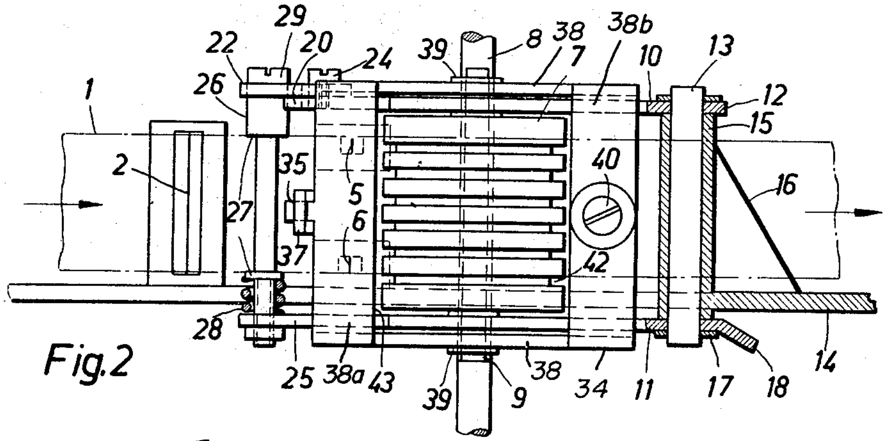

In a magnetic tape recorder a constant tape speed for recording and reproducing is determined by the speed of a driving or capstan roller, against which the tape is pressed by means of a pressure roller rotatably suspended and having an elastic surface. Firmly coupled with the drive roller is a flywheel rotated by a drive motor and serving to stabilize the speed of the tape. Where no special provision is made there is the danger that in consequence of inaccurate axial parallelity between drive and pressure rollers the tape diverges laterally from the normally horizontal direction of travel. For this reason the pressure roller is spring suspended on a swivelling lever so that the roller aligns itself automatically parallel to the axis of the capstan, which was accurately adjusted in manufacture. This measure does not usually ensure proper tape movement, however. Home tape recorders with a combined recording/reproducing magnetic head and an erasing head are known which for this reason have incorporated an additional tape guide roller disposed fixed in space between the drive roller (capstan) and the combined magnetic head. This ensures the tape to pass the magnetic recording/reproducing head at the correct height or level and the above described disadvantages do not occur.

It has appeared that the measures hitherto adopted are not sufficient to secure tape movement in the region of the magnetic heads which will fulfill enhanced quality demands, particularly as the problem of the means of pressure on the tape in the region of the magnetic heads is closely bound up therewith. For if unevennesses occurs when the tape is pressed against the magnetic heads, this can also cause the tape to diverge in the direction of the drive roller axis. This means that it is e.g. possible that the tape coming from a feed reel diverges in the region of the erasing head from the desired path through uneven pressure on the tape, thus passing the recording/reproducing head at the wrong level. The consequence is a recording departing from the norm position and/or scanning of the tapes with the known undesirable consequences.

The object of the present invention is to provide improved means to ensure that the tape is fed past the fixed magnetic heads of a tape recorder in all circumstances in the prescribed position and direction.

In the apparatus of the invention a swivelling lever which carries a pressure roller for pressing the tape against a driving roller is U-shaped and its legs are extended on one side to form parallel carrier arms. These arms are directed to the space between two magnetic heads. Between the free ends of the carrier arms a tape guide roller and a swivelling pressure lever are fastened; one of said carrier arms is pivotally connected with the corresponding leg of said swivelling lever.

Further details of the invention are explained with the help of the drawing, which shows schematically two embodiments for an apparatus for magnetic recording and reproducing of video signals.

Figures 1, 1A, 3:
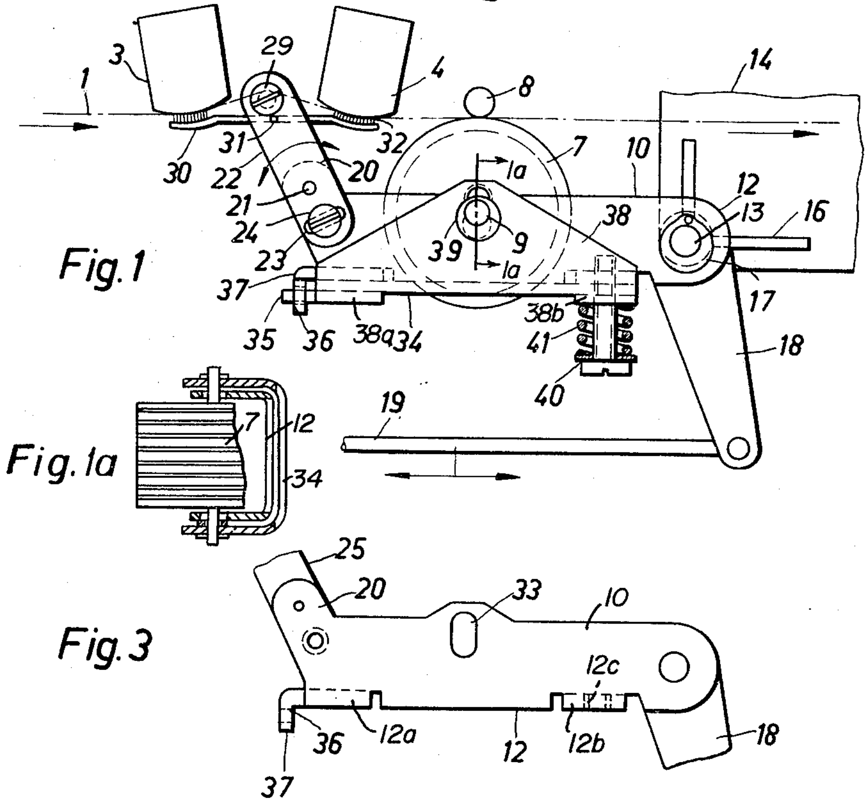
Figure 5:
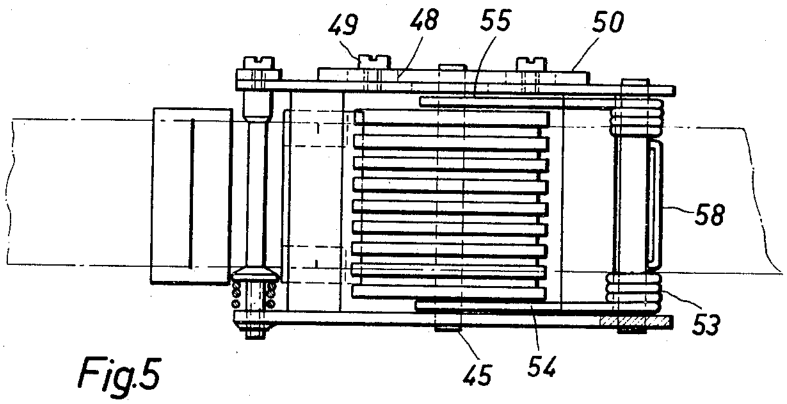
Figure 4:
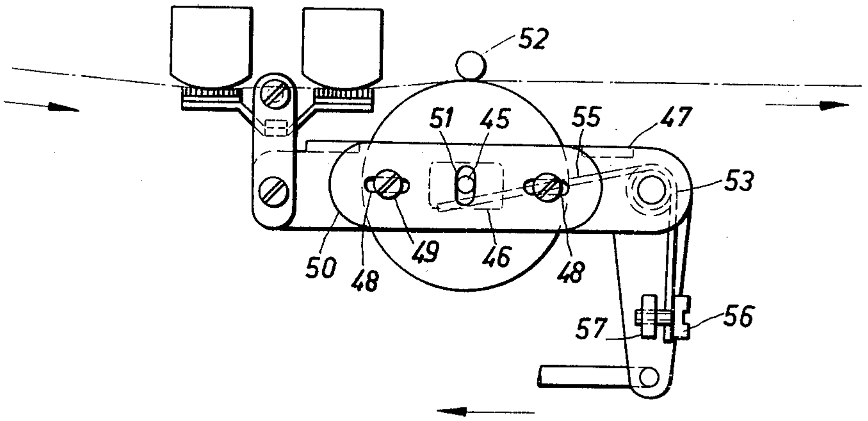

In the drawing:

FIG. 1 indicates a top view of a device in accordance with the invention,

FIG. 1*a* shows a cross-sectional view taken along the line 1*a*—1*a* of FIG. 1, FIG. 2 shows a front view of the device, in which the tape pressing part in the region of the magnetic heads is omitted for better visibility, FIG. 3 shows a view of a pressure lever, FIG. 4 shows a view of another device, and FIG. 5 is a front view of the device in accordance with FIG. 4, in which the tape pressing part and the drive roller are omitted.

In FIG. 1 a magnetic tape 1 for video recording and reproducing firstly passes an erase head 3 covering with its operating gap 2 (FIG. 2) the entire width of the tape and then a sound and synchronizing track magnetic head 4 laterally disposed thereto. The magnetic head 4 contains two separate systems, one of which with an operating air gap 5 serves for sound recording and reproducing, the other with an operating air gap 6 for recording and reproducing television synchronizing signals. The air gaps 5, 6 each pass over one margin of the tape and in recording supply two parallel marginal tracks, between which space remains for recording the television video signals. A rotatably suspended pressure roller 7 presses the tape against a rotating driving roller 8, which in a manner known and therefore not shown in the drawing is firmly coupled to a flywheel mass rotating at constant speed, thus causing the said tape to travel in the direction of the arrow.

Pressure roller 7 is provided with a shaft 9, whose free ends pass through oblong holes 33 (FIG. 3) the middle of the legs 10, 11 of a substantially U-shaped pressure lever 12. The pressure lever can be swivelled round a journal pin 13 which passes through the legs of the U at one end, such journal pin being itself disposed to rotate with a bearing sleeve 15 made for example in one piece with a chassis 14. Stiffeners 16 impart adequate rigidity to the sleeve, and fastening discs 17 ensure axial anchorage of the journal pin in the bearing sleeve and in the pressure lever. The lower leg 11 (FIG. 2) of the pressure lever passes in the region of the journal pin 13 into a lever arm 18, which is bent downward somewhat and has jointed to its free end a tie rod 19 (FIG. 1) which when movement occurs in one of the two directions marked with an arrow swivels pressure lever 12 round journal pin 13. On the side of the pressure lever averted from journal pin 13, leg 10 passes into a lug 20, around whose pivot pin 21 a strip shaped carrier arm 22 swivels. The carrier arm has on the end towards the pivot a transverse slot 23 shown magnified in FIG. 1, which slot has passing through it a fastening screw 24 which can be screwed into the lug 22 to secure the angle position at which the carrier member is set to the longitudinal axis of the swivelling lever. The lower leg 11 of the swivelling lever 12 is provided with a rigid carrier arm 25 (FIG. 3) corresponding to the dimensions of carrier arm 22. Both carrier arms are connected at their free ends by a tape guide roller 26 with tape guide edges 27 (FIG. 2). Roller 26, which on one side is under the effect of a pressure spring 28, is continuously adjustable for height in such a way that with its screw head 29 freely passing through carrier arm 22 it can be screwed into carrier arm 25.

Between the two carrier arms 22, 25 furthermore a swivelling pressure lever 30 is provided (FIG. 1) which presses the tape 1 against the magnetic heads. The lever is made of spring-elastic material and it swivels round two pivots 31 which are coaxially superposed. One pressure lining 32 each, e.g. of plastic fibres, applies or feeds the tape 1 properly to the magnetic heads 3 and 4. The swivelling pressure lever 30 can at the same time serve as a screen for the operating gap of the magnetic heads.

The bearing system for pressure roller 7 has the following further peculiarities which enable it to be set automatically in axial parallelity to the driving roller 8 and which allow the pressure force between pressure roller and driving roller to be regulated. The holes for the passage of the pressure roller shaft 9 through the legs 10, 11 of the U-shaped pressure lever 12 are oblong holes 33 (FIG. 3). Further the pressure roller lever is enclosed by a swivelling part 34, also approximately U-shaped. The legs 38 (FIG. 2) of swivelling part 34 are identically shaped (FIG. 1) and connected by two parallel strips **38*a*, 38*b* which hold the legs in a distance corresponding to the high of pressure roller 7. Legs 38*a* is provided in its medium range of its left side (FIG. 2) with a lug or pivot 35. Pressure lever 12 is built up in a similar manner as swivelling part 34. Hereby the legs 10, 11 are held together by strips 12*a*, 12*b* (FIG. 3). In the range of lug 35 of swivelling part 34 strip 12*a* is provided with a side bar 37. Lug 35 is threaded into a puncture 36 (FIG. 3) of side bar 37, the side bar being bent to form an angle with the horizontal axis of pressure lever 12. The legs 38 of the swivelling part 34 each contain a cylindrical hole in which the ends of shaft 9 are suspended. On the outer side of the limbs 38 locking washers 39 embrace the shaft ends so that the shaft is held firm in the axial direction. Through strip 38*b* of the swivelling part a setscrew 40 passes freely, on which a pressure spring 41 is fixed. The setscrew can be screwed more or less deeply into a corresponding hole 12*c* of strip 12*b*, which allows the power exerted by the elastic pressure roller on the drive roller to be set as required. This effect can be explained as follows: In case of operation pressure lever 12 rests in a fixed position, see FIG. 1. But the position of pressure roller 7 in relation to driving roller 8 can be varied by shifting the swivelling part 38 in a direction to driving roller 8. If, for instance, the swivelling part is pressed towards the driving roller the pressure roller will be moved in the same direction because its shaft 9 is led within holes of the legs 38. By screwing the set screw 40 into the hole 12*c* pressing of the swivelling part 34 is affected whereby the connection between side bar 37 and lug 35** acts as a swivel hinge.

As the swivelling part 34 is only connected at the lug 35 and screw 40 with the pressure lever, it can move or turn at all times round the connecting axis between lug and setscrew. The same applies to the pressure roller suspended rotatably in the swivelling part, which roller thus aligns itself automatically parallel to the drive roller. The pressure roller 7 is provided in the axial direction with a multiplicity of annular grooves 42 which prevent the roller from being excessively elastically distorted when pressure is applied to the tape, which otherwise could also cause divergence of the tape from its prescribed direction of movement.

To save space and material, part of the pressure roller protrudes through a window 43 in the pressure lever 12 and in swivelling part 34.

In the exemplary design according to FIGS. 4 and 5 the adjustability of a pressure roller 44 is designed as follows: The upper end of the pressure roller shaft 45 protrudes freely through an approximately rectangular recess 46 of the swivelling lever, the dimensions of the recess far exceed the section of the pressure roller shaft.

The lower end of the shaft engages in the conventional manner in a lower bearing hole of the swivelling lever. The pressure roller is thus suspended to tumble to all sides. On the upper side of the pressure lever a bearing part 50 is seated which is provided with longitudinal slots 48 and is lockable with screws 49, which bearing part has a slot 51 running transversely to the direction of tape run, thus allowing the pressure roller shaft only to move transversely to the direction of tape run. By displacing the bearing part, the pressure roller shaft can therefore be swivelled round its lower bearing and accurately adjusted. The pressure roller is moved in the direction towards the drive roller by a spreader spring 53, whose free ends 54, 55, press in the gap between the pressure roller and pressure lever radially against shaft 45. The elastic force can be set to a definite level by means of a screw 56 which can be screwed into a side bar 57 of the pressure lever and catches the spring in the region of the bend 58.

What is claimed is:

1. A device for guiding and driving magnetic tape in apparatuses for magnetic signal recording and reproducing comprising a tape driving roller, a pressure roller, a shaft carrying said pressure roller, a first U-shaped pivotable lever having two parallel legs, said first lever carrying said pressure roll and its shaft between its two legs and having means for pressing said pressure roller against said tape and said tape driving roller to sandwich said tape between both of the rollers, a second U-shaped pivotable lever having two parallel legs, said second lever similarly carrying said pressure roller and its shaft between its two legs, said first lever and said second lever pivoting about the same axis, pivotable pressure lever means for uniformly pressing the tape against stationarily mounted erasing and recording or reproducing magnetic heads, and a tape guide roller, said first U-shaped pivotable lever having its two parallel legs extending to form parallel carrier arms with free ends in the vicinity of said magnetic heads, said tape guide roller and said pivotable pressure lever means being fastened between the free ends of said carrier arms, one of said carrier arms being pivotably connected with a corresponding leg of said first pivotable lever.

2. A device as claimed in claim 1, wherein said pivotable pressure lever means includes ends of spring-elastic metallic material facing the magnetic heads, said ends carrying pressure pads adapted to fit the surface of said heads.

3. A device as claimed in claim 1, wherein the two legs of said first U-shaped pivotable lever are provided each with an oblong hole for freely passing the ends of said pressure roller shaft, said pressure roller shaft is suspended by the legs of said second lever, said second lever is suspended from said first lever by a lug protruding at one end of the second lever and threaded into a hole of a said bar of said first lever, and said second lever is further attached at an opposite end to said first lever by set-screw means which pass freely through a hole of said second lever and is screwed into a hole of said first lever, a pressure spring being provided between the head of said set-screw means and said second lever.

4. A device claimed in claim 3, comprising in addition a bearing part, one of both said holes in said legs of said first U-shaped pivotable lever being rectangular shaped for free passage therethrough of one end of said pressure roller shaft and the other of both said holes forming a support for rotatably mounting the other end of said pressure roller shaft, said bearing part being fastened over said rectangular shaped hole to said leg having said rectangular-shaped hole and having a longitudinal slot over said rectangular shaped hole which is directed perpendicular to the axis of said driving roller, said bearing part further having means for adjustment in a direction perpendicular to the direction of said longitudinal slot, said one end of said pressure roller shaft passing through said slot, and both the ends of said pressure roller shaft biased in a direction towards said driving roller by spreader spring means mounted on said first U-shaped pivotable lever.

5. A device as claimed in claim 4, wherein a screw is mounted on said first U-shaped pivotable lever for adjusting the elastic force of said spreader spring.

References Cited

UNITED STATES PATENTS 3,298,583 1/1967 Weathers et al. ------ 226—180

3,233,807 2/1966 Wray -------------- 226—180
2,848,221 8/1958 Camras -------------- 226—1

LEONARD FORMAN, Primary Examiner

R. A. FIELDS, Assistant Examiner

U.S. Cl. X.R.

226—176, 187, 193, 194